United States Patent [19]

Berkling

[11] 4,075,689
[45] Feb. 21, 1978

[54] COMPUTER EMPLOYING REDUCTION LANGUAGE

[75] Inventor: Klaus Berkling, St. Augustin, Germany

[73] Assignee: Gesellschaft fur Mathematik und Datenverarbeitung mbH Bonn, St. Augustin, Germany

[21] Appl. No.: 657,839

[22] Filed: Feb. 13, 1976

[30] Foreign Application Priority Data

Feb. 15, 1975 Germany ............................ 2506454
June 10, 1975 Germany ............................ 2557958

[51] Int. Cl.$^2$ ............................................. G06F 7/38
[52] U.S. Cl. ............................................. 364/200
[58] Field of Search .................. 340/172.5; 445/1; 364/200, 900

[56] References Cited
U.S. PATENT DOCUMENTS 3,343,135  9/1967  Freiman et al. ................... 340/172.5
3,349,375  10/1967  Seeber et al. ..................... 340/172.5
3,737,864  6/1973  Werner .............................. 340/172.5

Primary Examiner—Harvey E. Springborn
Attorney, Agent, or Firm—Spencer & Kaye

[57] ABSTRACT

A computer including a control unit, an arithmetic-logic unit, an input unit, an output unit, a memory unit, and circuitry interconnecting the units for transmitting, processing and storing sequences of characters, the memory unit is constituted by a plurality of stack registers each having a large storage capacity for storing expressions in the form of strings of characters, and the control unit constitutes a reduction processor operatively associated with the stack registers for determining the reducibility, by means of a lambda reduction language, of the expressions stored in the stack registers and for executing any required reductions.

12 Claims, 19 Drawing Figures

FIG. 1
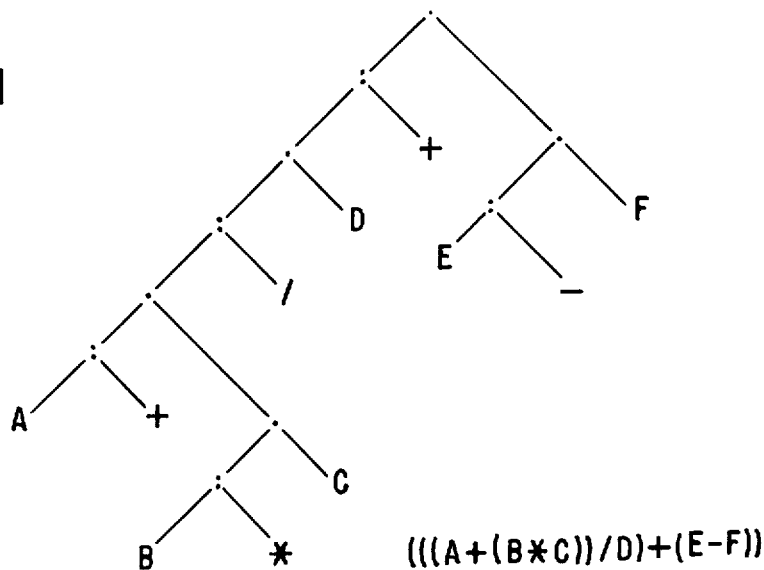
$(((A+(B*C))/D)+(E-F))$
FIG. 3a
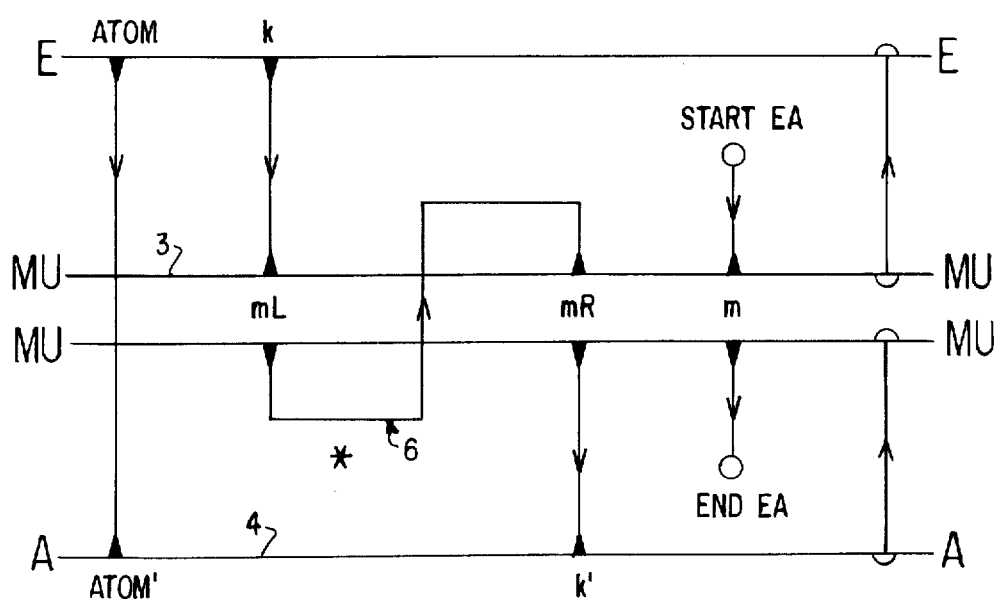
FIG. 3c

FIG. 7

| BITS 1-4 \ BITS 5-8 | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| 0 | BGZ | m⋅l | m⋅r | m▲l | m▲r | m:l | m:r | m\l | m\r | m↑l | m↑r | m•l | m•r | m~l | m~r | BGZ | 0 |
| 1 | mst | m⋅l | m⋅r | m∇l | m∇r | m⋅l | m⋅r |  |  |  |  | mℇ | m/ | mνp | mνn | EOS | 1 |
| 2 | mpl | m\Δ | m\∇ |  |  | mℇΔ | mℇ∇ | m•Δl | m•Δr | m•∇l | m•∇r | m\= | m\≠ | m\× | m/ | mpr | 2 |
| 3 | mst. | msga | msgb | msgc | msgd | msge | mπl | mπr | mπ'l | mπ'r |  |  | m(l | m(m | m(r |  | 3 |
| 4 | d | d' | σ | σ' |  |  |  |  |  | •' | → | • | − | ∨ | ÷ | ; | 4 |
| 5 | × | π | π' |  |  |  |  |  |  | ∇' | ( | ⊂ | ≠ | ∧ | ≤ | : | 5 |
| 6 | + | / | α |  |  |  |  |  |  | →' |  | , | = | − | > | \ | 6 |
| 7 |  |  |  |  |  |  |  |  |  |  | ≤ | ⊃ | ← | ≥ | .. | ) | 7 |
| 8 |  | A | B | C | D | E | F | G | H | I |  |  |  |  |  |  | 8 |
| 9 |  | J | K | L | M | N | O | P | Q | R |  |  |  |  |  |  | 9 |
| 10 |  |  | S | T | U | V | W | X | Y | Z |  |  |  |  |  |  | 10 |
| 11 |  |  |  |  |  |  |  |  |  |  |  |  |  |  |  |  | 11 |
| 12 |  | α | ⊥ | ∩ | L | ε | _ | ∇ | Δ | ? |  |  |  |  |  |  | 12 |
| 13 |  | ○ | ' | □ | I | T | O | ✦ | ? | ş |  |  |  |  |  |  | 13 |
| 14 |  |  | Γ | ~ | ↓ | U | ω | ⊃ | ↑ | ⊂ |  |  |  |  |  |  | 14 |
| 15 | 0 | 1 | 2 | 3 | 4 | 5 | 6 | 7 | 8 | 9 | z | z' |  |  |  |  | 15 |
|  | 0 | 1 | 2 | 3 | 4 | 5 | 6 | 7 | 8 | 9 | 10 | 11 | 12 | 13 | 14 | 15 |  |

COMPUTER EMPLOYING REDUCTION LANGUAGE

BACKGROUND OF THE INVENTION

The present invention relates to a computer of the type having a control unit, calculating, or arithmetic-logic unit, input-output unit, the execution of operations in the arithmetic-logic unit, and memories, if required, which are connected with one another for the transmission, processing and storage of sequences, or strings, of characters.

Conventional computers of the above-described type operate according to the stored program principle which goes back to J. v. Neumann. According to this principle, data and program instructions are stored in the form of words in addressable memory cells. Different regions of the memory are generally provided for data and program instructions. The arithmetic unit is generally composed substantially of a plurality of suitably coupled accumulators.

During execution of a program, one instruction is called up at a time and executed; at the same time, an instruction counter is set to the address of the next instruction to be executed. The instructions relate to the exchange of data between memory and arithmetic-logic unit, the execution of operations in the arithmetic-logic unit, and the control of data output. This all is done under the control of the control unit.

The stored program principle implies, in particular, that program instructions are also subjected to logic-arithmetic operations thus permitting the creation of branch programs, recursions, etc. This mode of operation, on which all computers in current use are based, is characterized in that a problem to be treated is divided, during the establishment of the program, into individual serially performed steps. From this linear sequence of steps, the problem is reconstructed by logic interrelationships within the computer.

The above-described mode of operation presents considerable drawbacks despite its wide-spread acceptance. Within a program, there occur dependencies which are hard to differentiate between instructions which are often quite remote from one another. The programs thus become cluttered and even minor changes may result in considerable interference in the program sequence. The indirect addressing of data in conventional computers requires extensive program portions which relate only to data access and to the distribution of memory locations and which generally are more complicated than the actual computing steps. Furthermore, in linear program sequences, the momentary state of the computer gives no indication of which state in the problem being treated has been reached with respect to the logic structure of that problem. Interaction between user and computer is practically impossible.

It therefore follows that it would be advantageous to provide a computer having a new logic organization which permits more simple program designs and direct interaction with a user.

The problems to be treated by computers have a language-logic structure. They can be represented by means of suitably defined logic elements which are linked together by so-called constructors. Generally, various linkages are nested within one another. This results in a branched-out logic structure for the problems to be treated which is called a "tree".

In particular, it is always possible to produce a binary tree which has only simple branches. The logic elements, which may be single or compound, represent the leaves of a tree and are here called atoms, the linkages between the atoms, i.e. the constructors, are at the nodes. Constructors may also link together more complicated structures, so-called subtrees.

Constructors and atoms are preferably encoded in 8-bit quantities (bytes) such that the circuitry can easily distinguish them by testing one bit position, for example.

Generally atoms are formed by one or more bytes. These can be stored in conventionally built-up registers and can be translated easily in standard character set encodings.

The trees per se have a two-dimensional structure, but by various means they can be unequivocally brought into the form of a linear string of characters.

An example of this is shown in FIG. 1.

A node is a point from which there extend two downwardly-directed branches. A point which is connected only to a node is a leaf. In a tree structure of the type shown in FIG. 1, each node constitutes a constructor and each leaf constitutes an atom. A constructor defines the relationship between the two branches extending downwardly therefrom. The expression represented by the illustrated tree structure is linearized, as is known in art, according to the convention that one begins with the highest node, followed by the linearization of the left successor tree and then followed by the linearization of the right successor tree. Linearization of the complete expression simply involves proceeding in the same manner each time a node is encountered.

Furthermore, two successive constructors.: represent a beginning parenthesis, while end parentheses are implied. Thus, the tree structure shown in FIG. 1 can be directly converted to the linearized expression also shown in FIG. 1.

In a machine, each letter, constructor and mathematical symbol will be encoded into a respective byte composed of a selected number, e.g. 8, of binary bits.

The letters, A, B, C, D, E, F are simply encoded into bytes as well as the arithmetic operators. The letters denote variables to be replaced by numbers such that a computation can take place.

The linearization shown in FIG. 1 is called a pre-order linearization. The described linearization of expressions has nothing in common with conventional programming in which there are only linear instruction sequences provided to execute an algorithm. Hereinafter, the term "expressions" is always intended to mean pre-order linearized binary trees.

Proposals have been made, as disclosed, for example, in U.S. Pat. No. 3,646,523 and IEEE Transactions on Computers, Volume C-20, April, 1971, at page 404, for designing computers in which the program is represented in the form of such expressions. The machine language of these computers is based on the known calculus of lambda conversion, described in Church, ANNALS MATH. STUDIES, No. 6, Princeton Univ. Press, 1941. In these known computers the calculating unit is designed in a conventional manner and the tree structure is preformed in the address representation of the control unit. These approaches have been found, however, to result in computers which are relatively very complex. The accommodation of real problems and the desired direct interaction between computer and user is only possible if use is made of special programming measures which nullify the simplicity of this concept.

There exists a known class of programming languages identified as reduction languages, which are described in: John Backus, IBM Research Report RJ 1010, 1972; and John Backus, IBM Research Report RJ 1245,1973, in which the computations specified by a program consist in a transformation of the program representation into a representation of the result by means of reduction steps.

SUMMARY OF THE INVENTION

It is an object of the present invention to utilize, in a computer of the above-described type, a reduction language to transform expressions present in the form of a program into result representations to thus assure a program sequence which is easily monitored at any time and can be influenced by the user.

This is accomplished according to the present invention by including, within the computer, at least three sets of binary word storage locations, with each location being arranged to store a representation of a plurality of binary bit values constituting a binary word representing data or operational information and the storage locations of each such set being interconnected to permit transfer of the representation of a binary word from one location to another within the set while permitting a predetermined order between the binary words to be preserved, each set being arranged to permit binary words to be read into and out of the set only via a single, preselected location thereof, conductors being connected for transporting binary words into and out of only the preselected location of each set, and by including, in the control unit a fixed, preset logic member connected to sense the binary words present in the preselected locations of the three sets and to control the movement of binary words into and out of at least one of those preselected locations solely in dependence on the identities of the binary words currently in the preselected locations. Preferably, the sets of locations are constituted by stack registers.

Stack registers are known per se but have thus far been used in computers only in the conventional manner as accumulators, or to store a representation of the environment which is necessary for the implementation of higher level languages. The property of stack registers which is of significance for the present invention is that the expressions stored therein can be shifted up and down, i.e. from one register stage to the next, by means of pulses, and since access to stored expressions is obtained only via the top stage of a register, addresses are not required. The length of the stack registers is determined not primarily by the structure of the computer according to the invention and thus by a relatively small number of words which must be manipulated, but rather determined by the size of the expressions to be reduced. Therefore, the stack registers generally have a relatively great length.

The reduction processor in which constructors and atoms are defined scans the expressions stored in the stack registers in forward and backward direction, determines the reducibility of the expressions and performs the reduction, if required, by substitution into the stack registers. It is here a prerequisite, of course, that the expressions to be reduced contain only characters which can be defined in the reduction processor and which consequently can be identified by the processor. The reduction generally takes place in a plurality of sequential steps and produces a constant expression as a result, a constant expression being one that can not be further reduced. If an expression which is not constant is found to not be reducible, the reduction processor will not terminate with an incomplete reduction but will attempt to perform other reduction rules. This produces a series of pseudo-constant expressions at the output to indicate an error condition.

It is here of particular significance that the expressions describing the problem to be treated are always and completely present in the stack registers. Any momentary state of the system can thus be clearly defined with respect to the problem, in contradistinction to the prior art computers in which defined states exist only with respect to a position in the instruction sequence which represents the algorithm of the problem solution and which has no direct relationship with the actual problem. The clearly defined tree structure of the expressions and the special properties of the stack registers eliminate the requirement for addresses so that the program expenditures for data access and distribution of memory locations are eliminated. An extensive amount of software required for known computers is eliminated to a large extent or replaced by hardware.

Of significance for the operation as well as for the hardware realization of a computer having the above-described structure is its access structure, in other words the relationship between the reduction processor and the stack registers.

It is to be understood, of course, that in the practice of the invention, the stack registers need not have any particular physical form. They can be constituted, for example, of a plurality of parallel connected shift registers, or a read/write memory in association with pointers.

It is known to process first the character which was entered last into a memory, a procedure therefor being disclosed, for example, in German Auslegeschrift (Published Patent Application) No. 1,094,019. This mode of operation, which is also referred to as the "last-in first-out principle", has thus far been used only in different types of computers which operate with a conventional computing unit and for the purpose of providing an orderly intermediate storage of characters or operators, respectively, which are read out again in the corresponding sequence during the course of a computation.

In the computer according to preferred embodiments of the present invention the computing process takes place in such a manner that the reduction processor performs state transitions involving the top cells of the stack registers. The reduction processor, in which the particular relations between constructors and atoms which constitute reduction rules are defined, determines the reducibility of the expressions by testing the top cells of the stack registers and performs the reduction, if required, by executing several state transitions. These involve for example, appropriate alteration and/or substitution into the top cells of the stack registers.

A reduction rule relates to, and is defined uniquely by, a particular combination of the values representing, in a tree structure, a selected constructor (at a node), the constructors, or leaves, immediately succeeding that selected constructor and the constructor immediately preceding that selected constructor. Performance of a reduction rule involves replacing such a combination of values, at that location in the tree structure, or in the expression, by another value, which is determined by the reduction rule itself, and usually results in a smaller tree structure, or a shorter expression.

In a further advantageous embodiment relating to the state transitions with which the reduction is effected, the present invention provides that state transitions include the operations of popping a selected stack register, pushing a seleced stack register, or altering a selected stack register. As is known, "popping" involves moving the content of each register stage to the next adjacent stage, in the direction toward the top stage thereof. In this case, the content of the top stage would be shifted out of the register. On the other hand "pushing" is a corresponding shifting movement in the opposite direction.

According to a further feature of the invention, there can be provided a group of state flip-flops connected to be set in a pattern identifying a selected characteristic of a value currently stored in the top location of a selected stack register. Such a characteristic could be, for example, whether that value relates to a constructor or an atom. In this case, state transitions can also include setting the flip-flops in any predetermined state pattern.

Preferably, the reduction is effected so that the rearrangements of atoms or constructors, respectively, which are part of a reduction rule, are effected exclusively by combinations of the above-mentioned state transitions.

The above-described measures enable complex problems to be treated with great dependability in a simple manner which can easily be translated into hardware, and there exists the possibility, within the generalized "last-in first-out" access structure, of treating the most varied problems with optimum utilization of the available hardware.

The program is not executed in the form of a series of instructions which are interconnected with other instructions in an opaque manner, but is rather executed locally with respect to the problem, i.e. by way of reduction of expressions by substitution. The sequence remains manageable and permits influence by the user at any time. A problem to be treated is solved so-to-speak "live" by way of "interactive" programming.

The computer according to the present invention is based on the use of a particular, recently proposed reduction language which is based on the above-mentioned lambda calculus and which is referred to as the lambda reduction language.

Such languages are described in the above-cited published reports by John Backus. A reduction language is formally defined as follows An expression is either an atom or a constructor followed by one or two expressions.

An atom is either a word or a number or an operator.

A word is a sequence of letters of the alphabet.

A number is a sequence of digits from 0 to 9 preceded by a sign.

An operator is either
  an arithmetic operator, or
  a logical operator, or
  a "]", a "⊂", a "⊃", or "□"

An arithmetic operator is any one of the known ones.

A logical operator is either
  a "T", or a "⊥", or a "∧", or a "∨", or a "∪", or a "∩".

A constructor is either a 1-constructor or a 2-constructor.

A 1-constructor is either a "ε" or a "/".

A 2-constructor is either an applicator, or a binding constructor, or a list constructor or a "~" (the latter appears only in context with arithmetic).

An applicator is one of the characters
  "→", "←", "Δ", "∇", ".", ":".

A binding constructor is either
  a "λ"
  or a " ↑ " (recursion constructor).

A list constructor is either
  a "∘", or a ",", or a "["
  (all three list constructors have the same meaning. Their differences serve only to improve the print picture, e.g. [A, B, C] instead of ∘ A ∘ B ∘ C ]).

A sequence of letters may be prefixed by any number of "/" characters.

A binding constructor may have only a word as its left-successor.

Because of the role words play in the beta-reduction rule they are also called variables.

As a basis for a more detailed explanation of the nature of reduction rules, the symbols $e, e_1, ..., e_k$ constitute meta symbols to denote expressions. Equal meta symbols denote equal expressions with respect to instance and corresponding replacement.

$n, n_1, ..., n_k$ denote numbers.

ap denotes an application constructor.

ar denotes an arithmetic operator.

The following table illustrates the nature of the reduction effected by a number of different reduction rules 1–14.

| Rule Number | Reducible expression | Result of reduction | Comment |
|---|---|---|---|
| 1 | $\Delta \top e$ | $e$ | |
| 2 | $\Delta \bot e$ | ] | |
| 3 | $.\cap e$ | $\bot$ | |
| 4 | $.\cup e$ | $\top$ | |
| 5 | $.\wedge \top$ .$\wedge \bot$ | ] | |
| 6 | $.\vee \top$ .$\vee \bot$ | $\cup$ ] | |
| 7 | ap ] e | $e$ | |
| 8 | $.\supset \circ e_1 e_2$ | $e_2$ | |
| 9 | $.\subset \circ e_1 e_2$ | $e_1$ | |
| 10 | .ar $n_1$ | $\sim n_1$ ar | |
| 11 | $.\sim n_1$ ar $n_2$ | $n$ | $n = (n_1$ ar $n_2)$ |
| 12 | ap ε $e_1 e_2$ | $e_1$ | |
| 13 | ap λ v $e_1 e_2$ | $e_1$ (containing $e_2$ at selected places) | |
| 14 | ↑ v e | ←λve ↑ ve | recursion rule |

To each reduction rule there corresponds a dual rule with a transposed applicator.

As an example we consider the so-called conditional construction $$\Delta \Delta p\, e_1 e_2$$

where p denotes an expression such that $M_p$ reduces either to $$\bot \text{ or } \top$$

By applying reduction rule number 1 to $$\Delta \Delta \top e_1 e_2,$$

by rule 1 reduction occurs to $$\Delta \varepsilon\, e_1 e_2,$$

and by applying reduction rule number 12 thereto, the result is $$e_1.$$

According to another example, application of reduction rules 5 and 3, successively, to the Boolean expression:

. : ⊥ ∧ T, yields ⊥.

The rules 8 and 9 correspond to the selector functions CDR and CAR, respectively, of the programming language LISP. These rules comprise a basic set to perform operations available usually only by higher level programming languages.
Other rules may be added.

Referring now, specifically to reduction rule number 13, the feature of major significance is here the treatment of variables. For this purpose, a new class V of atoms which are identified as variables v is introduced as well as a constructor lambda which is represented by the character λ. The capital V denotes the set of all sequences of letters, the v is a meta symbol denoting a particular member of the set V. Variables are externally represented by sequences of letters and internally by their codes, but are treated in any case as constants. This is in contradistinction to the conventional progamming languages in which variables are represented internally by a more or less complicated network of references to memory cells. The so-called lambda expression λ v e may again be a component, e.g. a successor, of an application constructor ap. The meta symbol ap denotes any one of application constructors . ← Δ. There are three corresponding transposed application constructors : → ∇ which are denoted by the meta symbol ap'.

The following axiom generally applies for applicative reduction languages

M ap e f = M ap M e M f where M identifies a semantic meaning function. The letter M juxtaposed to an arbitrary expression e denotes an expression c where all reduction rules occurring in e have been executed. Let M f = d. There is a representation function R which associates an expression g to the constant expressions c and d.

M ap e f = M R c d = M g

The representation function R comprises the necessary transformation of codes such that the machine can be used for practical data processing. In the illustrated form the axiom can be applied only if e is not a lambda expression, since e and f must be reduced to constant expressions before possible use of a representation function R.

If, however, e is a lambda expression, various reduction sequences are possible. These operations are derived from the beta conversion rule as described in the paper by Church, previously cited. Let g be a lambda expression λ v e in M ← g f = M R2 R1 g f M · g f = M R2 R1 g Mf M Δ g f = M R2 R1 Mg f The beta conversion rule is a reduction rule such that the expression f is substituted for free occurrences of v in e. Free occurrences of a variable are defined in Church's paper. Two representation functions occur. R1 prepares the lambda expression for subtitution, while the two-parameter function R2 performs the substitution. The application constructor ← performs the substitution using its components as they come, constant or not. The application constructor . reduces the expression f to a constant one prior to substitution. The application constructor Δ reduces the expression g to a constant one prior to substitution.

The above defined transposed application constructors : → ∇ denoted by the meta symbol ap' permute the role of their components such that M ap' f λ v e = M ap λ v e f.

The case where the first component is not a lambda expression does not require any further ap constructors. The described constructors together with their transposed forms suffice to represent all significant syntactic characteristics of higher level languages. Furthermore, it has been found that the combination properties of these constructors parallel those of the corresponding computer components so that relatively complex syntactic structures can be produced in an economical manner.

The problem of free and bound variables requires special treatment in the reduction process. A particular lambda bar constructor is defined which prevents a possible free occurrence of a variable from inadvertently being bound during substitution. The lambda bar constructor represented by the character / cannot be put into the input but appears only in the computer output as part of lambda bar expressions like /v which replace v under certain conditions. Lambda bar expressions occur only as components of lambda expressions with the same variable. When such lambda expression is applied to an argument the lambda bar constructor will automatically disappear. This solution has been proven in practice and is less restrictive than known processes.

Writing in and reading out of arithmetic or other expressions in the computer according to the present invention takes place in fully parenthesized form; however, the internal representation is in binary trees, one constructor corresponding to each right and left-hand parenthesis, and terms and operators occur as elements.

The fully parenthesized form employs only parentheses to group terms such that 3 * 4 + 5 has to be written ((3 * 4) + 5) to effect proper evaluation. The internal representation of (e + f), e.g., is . : e + f, where : applies + to e and the result of this is applied to f by the application constructor ".".

The reduction language which has been cursorily defined above and on which the computer of the present invention is based permits formulation of the logic functions "AND" and "OR", conditions, list structures, and of parameter calls by value and/or name. This will not be discussed in detail here. However, a brief discussion will follow of the treatment of functional expressions.

It is generally uneconomical to keep unreduced components in functions; functions are therefore usually constant expressions. Several parameters, i.e. the variables v1, ..., vn, are each listed with a lambda constructor:

λv1 λv2 ... λvn f

The arguments appear in the same sequence as the parameter variables; however, the corresponding application constructors appear in the reversed sequence:

apn ... ap2 ap1 λv1 λv2 ... λvn f e1 e2 ... en

The meta symbols ap1, ... apn denote one of the above-mentioned application constructors ., ←, Δ. At first, constructor ap1 and its components are reduced since it is the only one which is followed by a lambda expression as the operator component. The further procedure is in correspondence therewith.

Upon reduction of all ap constructors, all parameter variables are replaced in f by actual parameters. The reduction thus leads to a constant expression, i.e. the value produced by the function. If the number of bound variables is different than the number of arguments, the excess bound variables or arguments, respectively, are simply left standing.

The lambda reduction language also permits execution of recursions and iterations which will not be discussed here in detail. Thus all possible ways for the execution of computations are available within the framework of a language which, compared to conventional programming languages, is much more "expressive".

The following examples (a) to (g) depict selected intermediate stages in different exemplary reduction sequences.

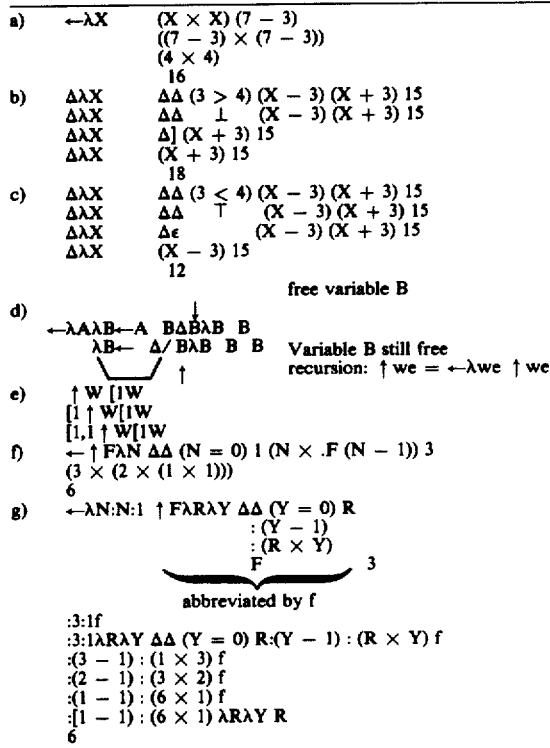

BRIEF DESCRIPTION OF THE DRAWINGS

FIG. 1 is a representation of the pre-order linearization of a binary tree.

FIG. 3a is a schematic representation of the transposition of an expression.

FIG. 3c is a diagram of a recursive control structure including a system stack for the transposition algorithm EA according to FIG. 3a.

FIG. 7 is a table illustrating the encoding of characters into bytes.

DESCRIPTION OF THE PREFERRED EMBODIMENTS

FIG. 1 shows how an expression is generated from a tree structure by pre-order linearization, and has been described in detail above.

Figure 2A:
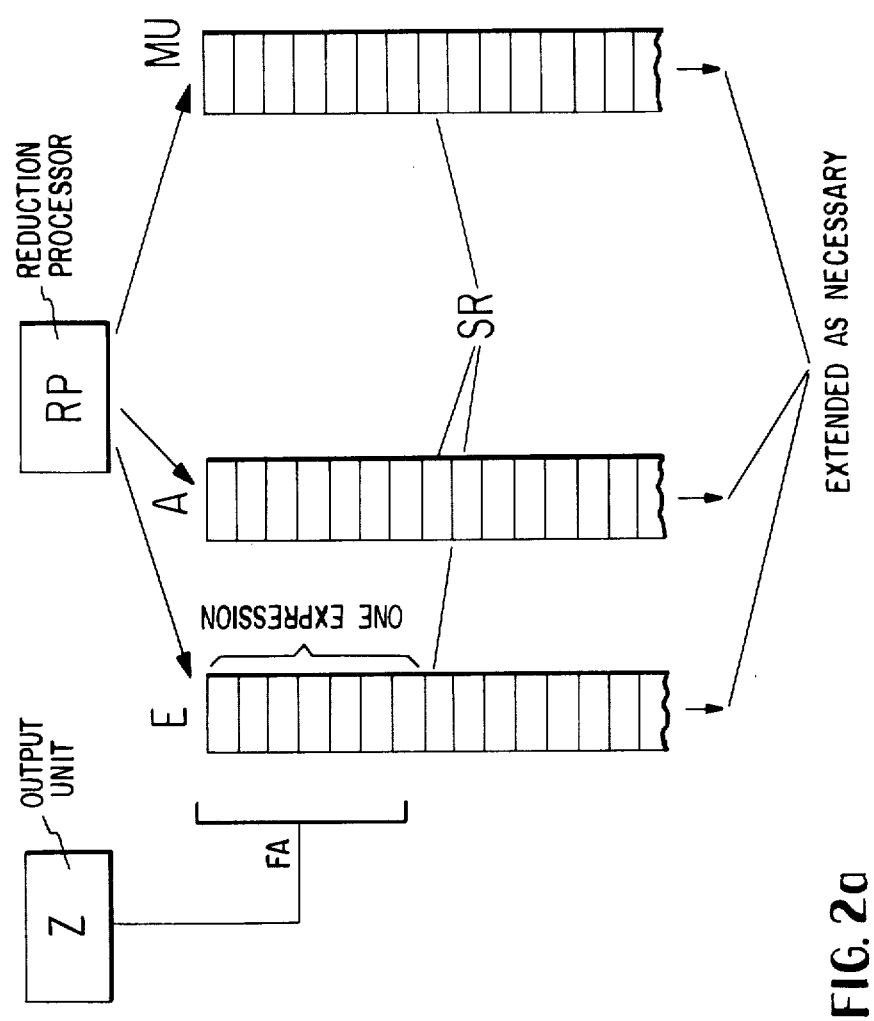
FIG. 2a is a block diagram of the principal structure of a computer according to the invention.

FIG. 2a shows the general structure of a computer embodying the invention. It essentially includes a plurality of stack registers SR with an associated reduction processor RP. There is also provided an output unit Z, which may be a visible display, printer, or the like. A control unit is also included but is not illustrated since it is without significance for the actual computation process.

Binary representations of expressions which have been linearized in the above-described manner are stored in stack registers SR, these registers generally having a great length to correspond to the size of the expressions which are to be reduced. Representations of a linearized expression are first read into register E. The reduction processor determines the reducibility of the stored expressions by scanning and, if required, performs the reduction by performing state transitions. The transporting of binary representations of an expression to registers A and MU are controlled entirely by the reduction processor. The association of the reduction processor to the stack registers is identified by a "last-in first-out" access structure, i.e. the character last fed into a stack register is the first one subjected to a state transition by the reduction processor. This can be realized in various ways, it always being important that due to the special characteristics of the stack registers, immediate, address-free access is possible.

The topmost expression currently in stack E, which can occupy one or more stages, constitutes the focus of attention, FA, of the output unit Z.

Figure 2B:
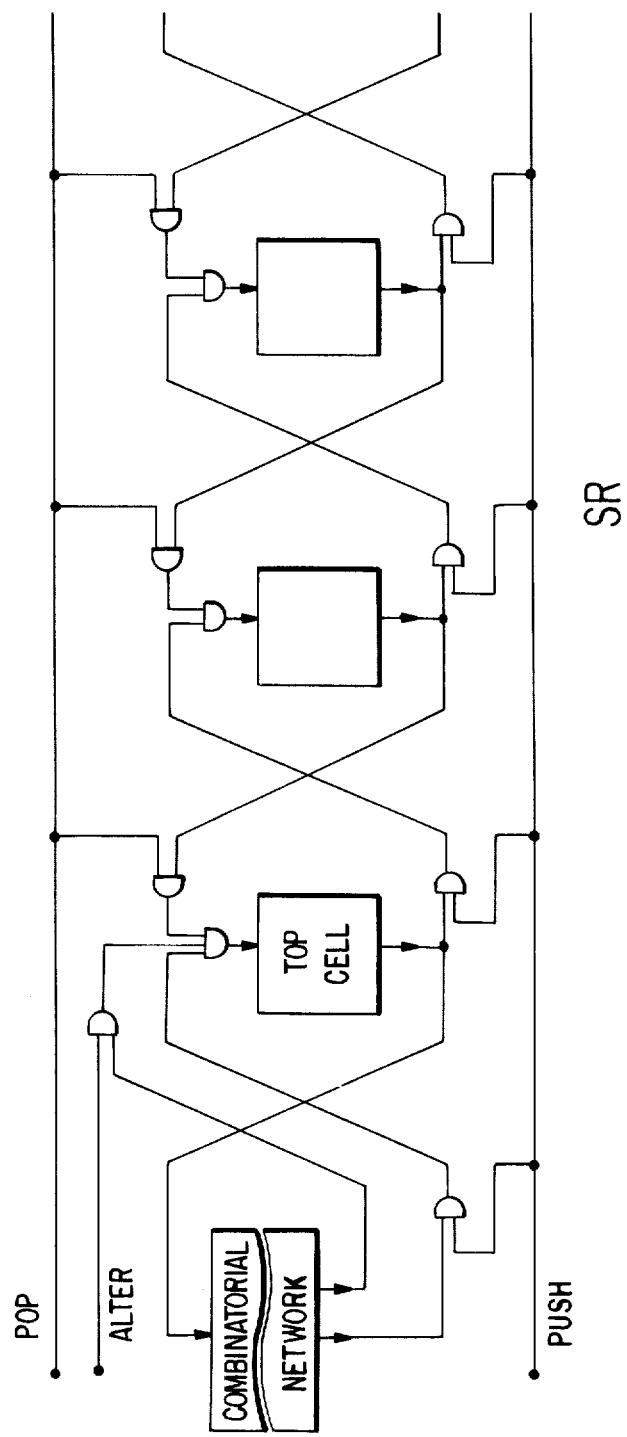
FIG. 2b is a representation of a stack register SR with its connections at the top cell.

In FIG. 2b there is shown one of the eight bit planes of a stack register SR with the top cell, or stage, at the left margin. As is well known, a POP signal is gated to the output of each cell except the top cell, such that upon appearance of the POP signal each cell assumes the contents of its right neighbor cell. Conversely, a PUSH signal is gated to the output of each cell such that upon appearance of the PUSH signal each cell assumes the contents of its left neighbor cell, where the contents of the top cell is determined by the combinatorial network at the left margin of FIG. 2b. This combinatorial network selectively interconnects the top cells of all stack registers.

The ALTER signal gates the output of the combinatorial network to the top cell only. This abbreviates a popping followed by a pushing of the same stack.

Various known schemes to extend the stack registers may be employed such that not the whole contents are moved when popping or pushing. A buffering using directly addressable and secondary storage is possible as long as the behavior of the top cell is not altered.

As used herein, the term "expression" indicates a string, or sequence, of characters, each character being identified by a byte composed of a number of binary bits, the number of bits depending on the structure of the computer being used and on the number of different characters which are to be employed in a computing system. In a preferred embodiment, each byte is composed of 8 binary bits. Whenever reference is made hereinafter to a "character", it is to be understood that it refers to one such byte.

As previously mentioned, an "expression" as used herein means a pre-order linearized binary tree. It also means a series of character-representing bytes of any length. A constructor is normally constituted by a single byte and acts to link two expressions in a particular way, or according to a particular relationship.

The reduction of an expression is preferably effected in that initially an expression contained in stack register E has its transposed version generated in stack register A.

FIG. 3a illustrates an expression ka1a2 in stack register E which upon execution of the transposition, appears as the transposed expression k'a2'a1' in stack register A.

Figure 3B:
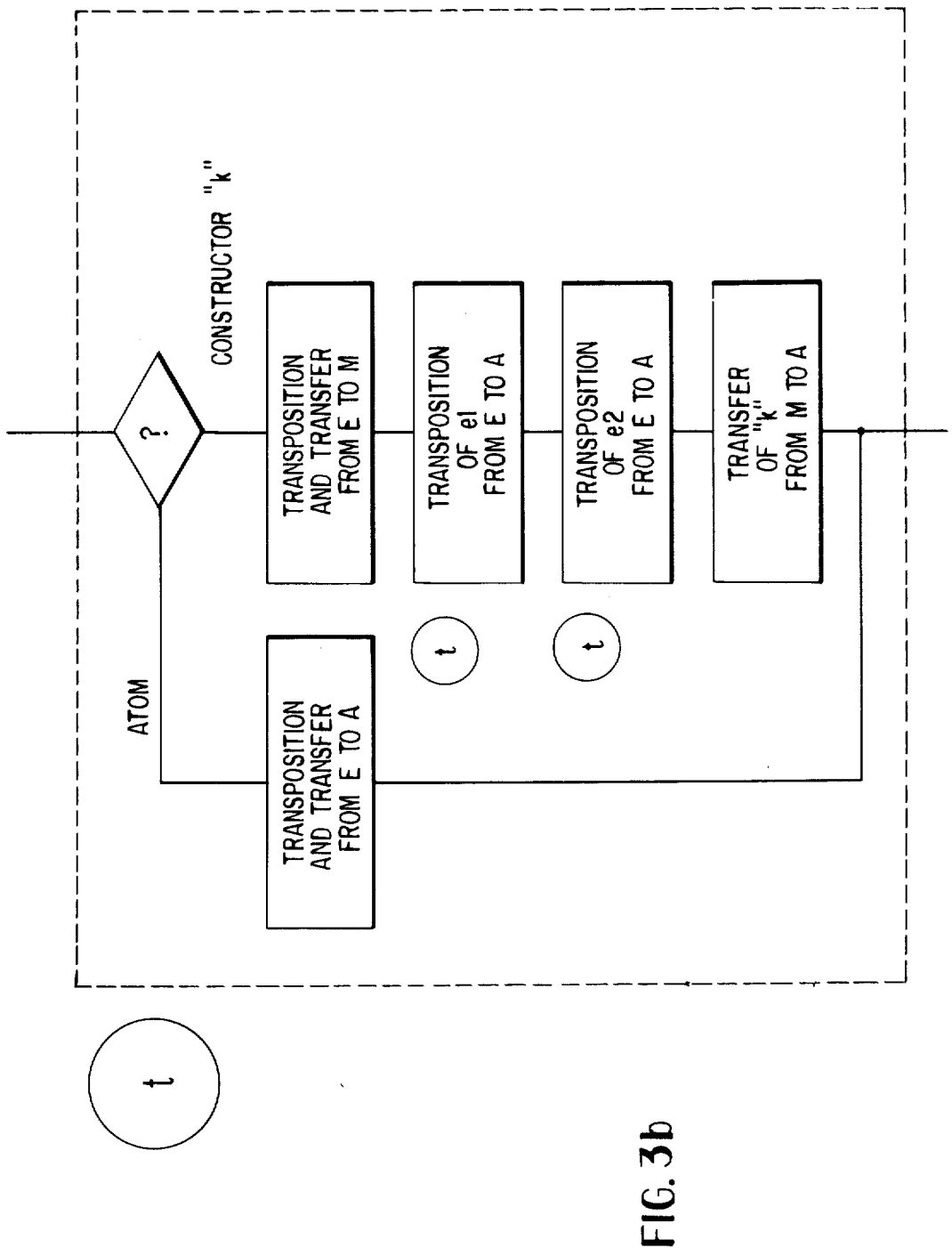
FIG. 3b is a flow diagram illustrating the procedure for transposition by means of a recursive control structure.

FIG. 3b presents a flow diagram used to explain the problems inherent in the construction of a control structure with which the transposition is effected. Initially it is determined whether an element to be transposed is an atom or a constructor. Atoms are transposed directly and transferred into stack register A. A constructor k is temporarily transposed in a further stack register M, then the components of the constructor are transposed from E to A and finally the transposed constructor k' is also transferred from M to A.

The following should be noted in this connection: the control structure effects transposition of an expression and is thus interrogated twice. This cannot be effected in a loop in the usual manner since additional information is required even at the beginning to determine the entry into the control structure at the return point. Thus the above-mentioned scheme is of no use. The reduction processor RP therefore advantageously includes a system stack register MU in which the return points are retained during the generation of the transposed version of an expression. The system stack register MU simultaneously takes over the role of stack register M in that the constructors in the return points are also encoded. The system stack register has the same structure as the stack registers and also has a great length so as not to restrict the size of the expressions which are to be reduced.

The control structure will now be explained in detail with the aid of FIG. 3c in which stack registers E and A and the system stack register MU are shown schematically. The principal pattern for the control flow is that a character is taken from a stack register and an associated state transition is created. This is shown in an abbreviated version by a horizontal line and solid triangles which are associated to the respective characters. The introduction, or writing in, (pushing) of a character into a certain stack register is indicated by a solid triangle which points upwards, correspondingly a downward pointing solid triangle indicates discharge, or reading out (popping), of a character. FIG. 3c shows how an atom is transposed directly from E to A in the above-described transposition process and how a constructor k in system stack MU appears in the form of stack markers. There of course also exists a reverse transposition algorithm AE which is defined in that it reconstitutes the original state of all stacks following algorithm EA.

FIG. 3c illustrates the processing of an expression composed of a constructor k and two atoms a1 and a2. Initially, this expression is stored in stack register E with constructor k being located in the top location of the register and atoms a1 and a2 located in respective succession locations, or groups of locations. Since an atom can be of any length, and since each register location can contain only one byte, an atom can occupy a number of successive register locations.

In the operation depicted in FIG. 3c, the byte present in the top location of register E is tested and it is found that this represents the constructor k. Therefore, the logic controlling the operation of the system pops register E, i.e. moves the byte in each register location to the next higher location and transports the byte representing k out of the top location of register E and transfers to the collector line, and hence the top location, of register MU a byte representing mL, the stack marker corresponding to constructor k and identifying the left successor of constructor k. A control signal is then automatically transmitted to the control point associated with collector line 3 and appearing at the right-hand side of FIG. 3c and this control signal acts to cause the byte now contained in the top location of register E to be tested. This testing reveals that an atom, or the first byte of an atom, is present in this top register location and the logic circuit causes the content of this top register location to be transported to the top register location of register A.

If atom a1 is constituted by a plurality of bytes, each such byte is transported in succession into register A and successive bytes are pushed through the locations of that register. Therefore, the bytes of atom a1 will appear in adjacent locations of register A in the inverse sequence to their arrangement in the register locations of register E. Of course, the bits of each byte will remain in the same order. This inverse arrangement of bytes is represented in FIG. 3c by the designation Atom' and in FIG. 3a by the designation a1'.

After an entire transposed atom has been read into register A, a control signal is conducted to the control point associated with collector line 4 and appearing at the right-hand side of FIG. 3c, instructing the system to then test the content of the top location of register MU. Since, in this case the content of the top location of register MU is mL, the logic circuitry causes this stack marker to be transposed to that stack marker which corresponds to constructor k and a designation of the right-hand successor of that constructor. Thus, a byte representing mR is then present in the top register location of register MU.

After this occurs, a control signal is again supplied to the control point associated with collector line 3 to cause the next atom, a2, whose first byte is then present in the top location of register E, to be tested. It being determined that this is also an atom, the byte or successive bytes, of atom a2 are transported from register E to register A, in the same manner as for the bytes of atom a1. When the entirety of atom a2 has been thus transferred, as transposed atom a2', into register A, a control signal is again applied to the control point associated with collector line 4 to cause the byte in the top location of register MU to be popped out of that register and to cause a byte representing the corresponding constructor to be delivered to the top location of register A.

The byte then present in the top location of register A represents constructor k', which differs from constructor k in that k' indicates that the left and right successors of k are to be interchanged. There is thus present in register A, reading from the top location down, the expression shown at the right-hand side of FIG. 3a.

After k' has been read into the top location of register A, a further control signal is supplied to the control point associated with line 4 to cause a test to be performed on the current content of the top location of register MU. Since, before the start of the operation depicted in FIG. 3c, the content of that location was a stack marker m indicating that the particular processing operation under consideration is to be terminated, and since the popping of mR from the top location of register M results in the reintroduction of stack marker m into that top location, the result will be a signal which terminates this particular processing operation.

The principal hardware for performing the transportation of an expression from stack E to stack A is embodied in the combinatorial network of FIG. 2b. The actual computing, i.e. the performing of reduction, uses a copy of the transportation algorithm augmented by circuitry to test for the occurrence of reduction rules and executing them.

Figure 4:
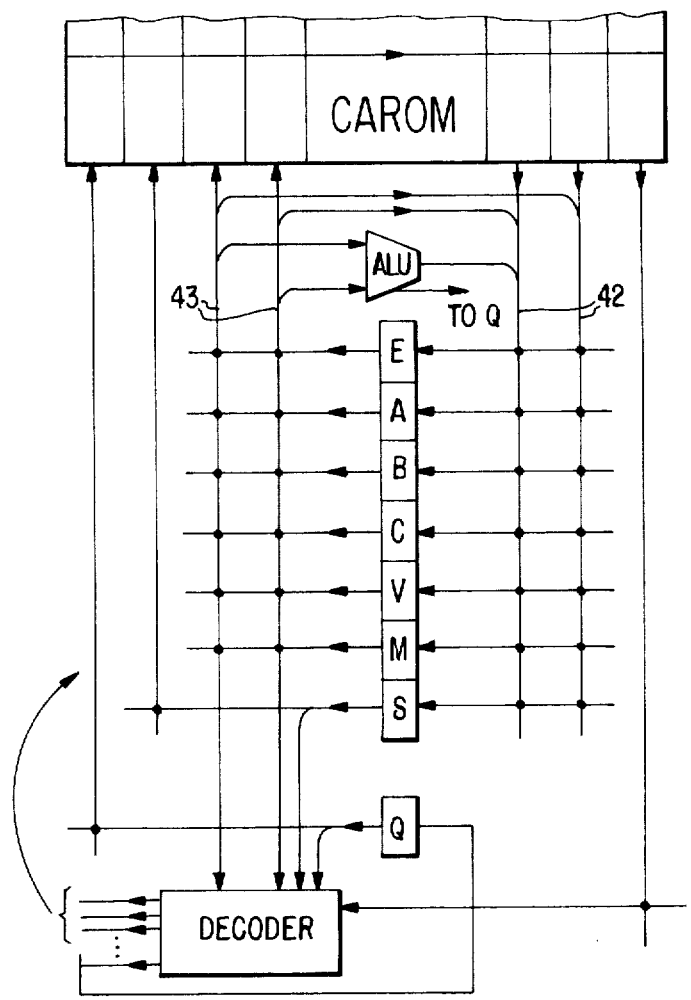
FIG. 4 is an illustration of the combinatorial network connecting the top cells of the stack registers and the control board.

FIG. 4 shows an overview of the combinatorial network which includes a decoder, a content-addressable read-only memory CAROM, the arithmetic-logic unit ALU, and the conductors interconnecting these units with one another and with stack registers E, A, B, C, V, M and S and flip-flops Q. The top cells of the stack registers are shown in the center line. A stack register S and a row of flip-flops Q are provided to encode machine states. Two access circuits 42 are provided for the inputs and two access circuits 43 for the outputs of the top cells of the stack registers.

Additional registers such as B, C and V are provided for intermediate storage of expressions. The number of additional registers provided depends on the complexity of the reduction rules to be performed by the system.

On top of FIG. 4 is exhibited the control memory embodied preferably by a content-addressable read-only memory CAROM. The state of register S preselects a set of rows belonging to and handling the algorithm encoded in that state. Further selection of rows is accomplished by gating the top stages of one or two stack registers to the input of CAROM.

The output of CAROM may effect a pushing of one or two stack registers, where the output delivers the contents for the top cells, or a new setting for S and Q, or a combination thereof.

A mere transportation of an expression from one stack to another one preferably uses a direct connection of the output and input circuitry and wired logic to accomplish the four different moves illustrated in FIG. 3c.

The occurrence of a reduction rule can always be identified by combinations of constructors with constructors or atoms in the top cells of the stack registers.

Also provided between the access circuits of the output and input sides is an arithmetic-logic unit ALU to perform more complicated, but regular transformations on the top cell contents during transfer from a stack output to a stack input. In the following the performing of the reduction rules is illustrated by diagrams similar to FIG. 3c. These diagrams are shown in FIGS. 6a to 6g. They contain all information necessary to prepare the contents of the content-addressable memory CAROM shown in FIG. 4. The correspondence between the diagram information and the entries in CAROM is as follows: Each vertical line in a diagram corresponds roughly to a word in CAROM. The algorithm code on top of stack S selects the one or two stack registers for connection of their top stages to the input of CAROM. The state flip-flops select the distributor line within the algorithm corresponding to a subset of words in CAROM. The stack registers switched to the CAROM finally select a single word in the CAROM which is read out and which contains: (1) the information indicating which stack has to be popped or pushed, and which state flip-flop undergoes a change of state, and/or; (2) the bit pattern to be pushed into a selected stack. The required size of the CAROM can be greatly reduced by suitable coding and employing the DECODER.

The precise identity of the words permanently stored in the CAROM and the precise logic interconnections constituting the DECODER depend on the reduction rules to be performed and can be directly established by one skilled in the art, in accordance with existing standard procedures and based on the information contained in the diagrams of FIGS. 3c and 6a–6g.

Although an expression is not defined during transposition, its components are contained during this process in stack registers E, A and MU in such a manner that the occurrence of reduction rules can be recognized.

Figure 5A:
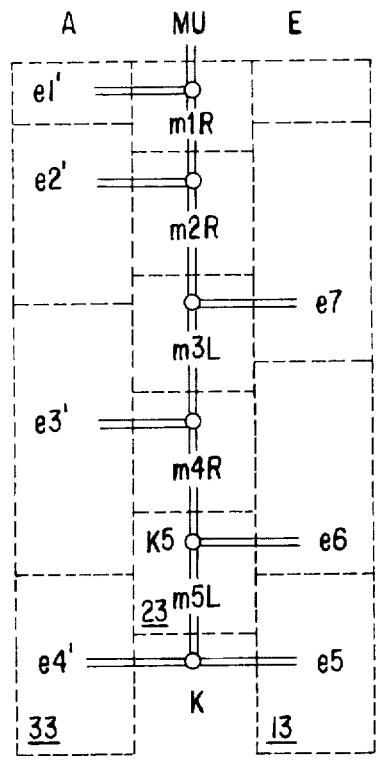
FIGS. 5a, 5b, 5c and 5d are pictorial illustrations of two examples of the reduction of an expression.
Figure 5C:
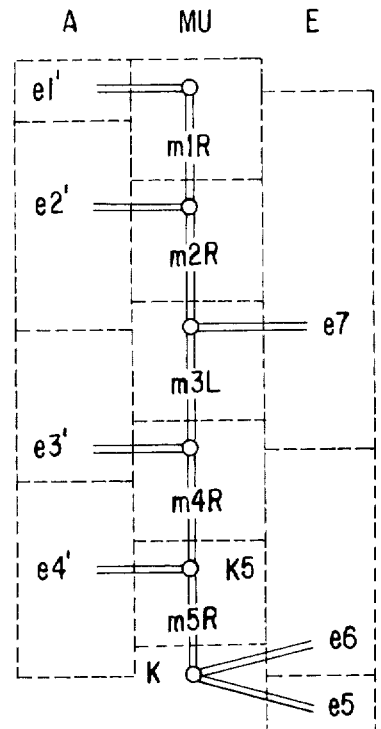
Figure 5B:
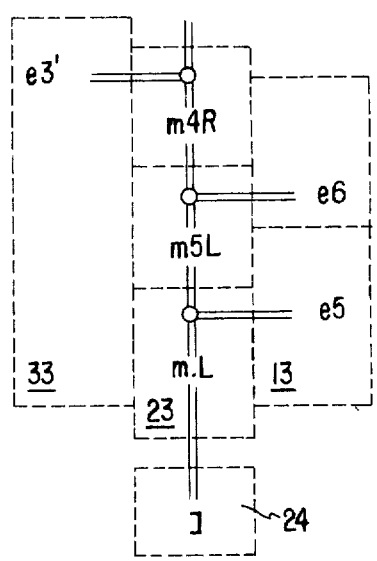
Figure 5D:
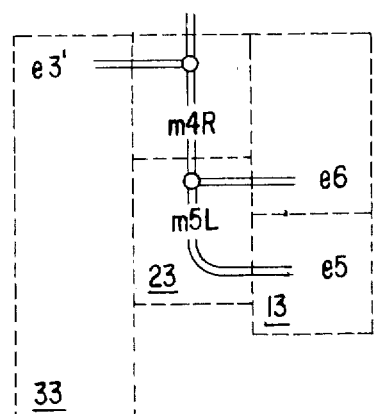

FIGS. 5a, 5b, 5c and 5d show two examples of expressions in mixed form, FIG. 5a illustrating a state before reduction and FIG. 5c showing the corresponding state after reduction, with respect to a first example. FIGS. 5b and 5d show details of another example, respectively. Some parts of the expression are represented as subexpressions e1 to e7, other parts as tree structure wherein the nodes are considered to be constructors. This simultaneously represents the state of the expression during transposition. Stack A contains the transposed subexpressions e4', e3', e2', e1', in reverse order, stack E contains the nontransposed expressions e5, e6, e7 in regular order. Stack system MU contains stack markers instead of constructors. These stack markers also contain the information as to whether the element is a left or right successor with respect to the preceding node. The illustrated condition corresponds to the location of control identified by arrow 6 in FIG. 3c, in which constructor k is coded.

An expression is consequently defined completely by the contents of the stacks and the position of the control system. By inspecting the respective topmost elements of the stacks it is possible to determine the left or right successor, respectively, of k as well as its predecessor and this also shows whether k itself is a left or right successor. In this way, the occurrence of reduction possibilities is determined during the transposition of an expression.

FIGS. 5a–5d illustrate the tree structures of the various expressions superimposed on the disposition of the bytes representing subexpressions and stack markers in the several registers, or stacks, E, MU, A. Thus, the solid double lines show the linkages of the tree structure, the white circles show nodes, or constructors, and the subexpressions e correspond to subtrees. The broken lines depict regions of the stacks E, MU and A and show the order in which the bytes representing subexpressions and stack markers are arranged. Each subexpression can occupy one or several adjacent register locations, while each stack marker occupies a respective location of stack MU. In FIG. 5a, transposed subexpression e4' occupies the top location, or group of locations, 33 of stack A, stack marker m5L identifying the left successor of constructor k5 is in the topmost location 23 of stack MU and subexpression e5 occupies the topmost location, or group of locations, 13 of stack E. The vertical divisions of stacks A and E depend on the number of locations, or cells, required by each subexpression stored therein.

Execution of a reduction rule consists of rearrangement of the respective upper ends of the stacks, or stack registers. If it is assumed, for example, that the uppermost element of the system stack MU is a marker m5L for a left successor of a construction k5, the expression starting from k5 will be, as shown in FIG. 5a k5 k e4 e5 e6.

If the marker m5L is replaced by m5R, which identifies the right successor of k5, the expression starting with k5 will be, as shown in FIG. 5c k5 e4 k e5 e6.

The other simple example shown in FIG. 5b and FIG. 5d is the identity function. It is assumed that an atom ] was erased from stack E and is now encoded into the location of control shown generally at 24. In this branch of the control structure it will now be determined whether the uppermost element of MU is a marker for a left successor of constructor. If this is the case the stack marker will be erased. FIG. 5d shows that the resulting tree structure now contains e5 instead of .] e5.

The following description refers to FIGS. 6a to 6g. The algorithm EAR which finds and performs reduction rules uses essentially the structure of the transport algorithm EA depicted in FIG. 3c.

Reduction rules always involve an applicator. The occurrence of an applicator is not suitable for testing if an instance of a reduction rule prevails, since usually the operator expression has to first be reduced.

Generally, each character appearing on top of E is checked to determine if it is in the operator position (this is left successor of ., ←, or Δ, or right successor of :, →, or ∇, respectively) of an applicator. This is easily done by inspecting the top cell of stack register MU.

A special technique has been developed to exhibit the recursive structure of the algorithms, that is the technique to install calls of an algorithm on itself.

There follows a short description of the symbols and terms employed in the various diagrams.

In FIGS. 6a to 6g, as in FIG. 3c, each horizontal line is associated to a stack, the particular stack being indicated at the left or right end of the line. There are two types of horizontal lines: distributors and collectors.

A distributor line distributes control depending on the contents of the top cell of the corresponding stack. A solid triangle annotated with a symbolic representation of the bit pattern in the stack points to the flow of control followed if that bit pattern appears at the top of said stack. A solid triangle means also that the annotated bit pattern is popped, i.e. removed from said stack.

A collector line joins several control paths into one. Solid triangles pointing upward are associated with collector lines and receive the flow of control. The annotated bit pattern is pushed into the stack associated with that collector line. the pushed bit pattern depends thus on the control path taken. A line connecting a downward pointing triangle with an upward pointing triangle means that one bit pattern is popped from one stack and another bit pattern is pushed into another stack. If the same bit pattern is annotated to the connected triangles, it is moved from one stack to another stack.

A hollow triangle on a distributing line relates to all bit patterns not annotated to solid triangles on that line. A hollow triangle on a collector line is always connected to a hollow triangle of a distributor line and this indicates that each bit pattern associated with the downward pointing hollow triangle is popped from its associated register and pushed into the register associated with the line on which the upwardly directed hollow triangle is disposed. If a distributing line and a collector line are connected in this way and are associated to the same stack, the stack is simply left unchanged.

The flow of control is directed from a collector line to another collector line or a distributor line by vertical lines starting with a semi-circle pointing downward and ending with a semi-circle pointing upward.

If a vertical connecting line runs through an oval with letters in it, an algorithm denoted by these letters is called. The letters E, A, B, C, V in an algorithm identification refer to the stacks involved in execution of the algorithm. Each algorithm starts and ends in an oval. When entering an algorithm, the first thing done is the pushing of a stack marker into system stack MU. When this stack marker reappears on top of stack MU, the algorithm has terminated and return is accomplished to the caller. The stack marker in stack MU and a code in stack S determining the algorithm ensure returning to the correct point.

Figure 6A:
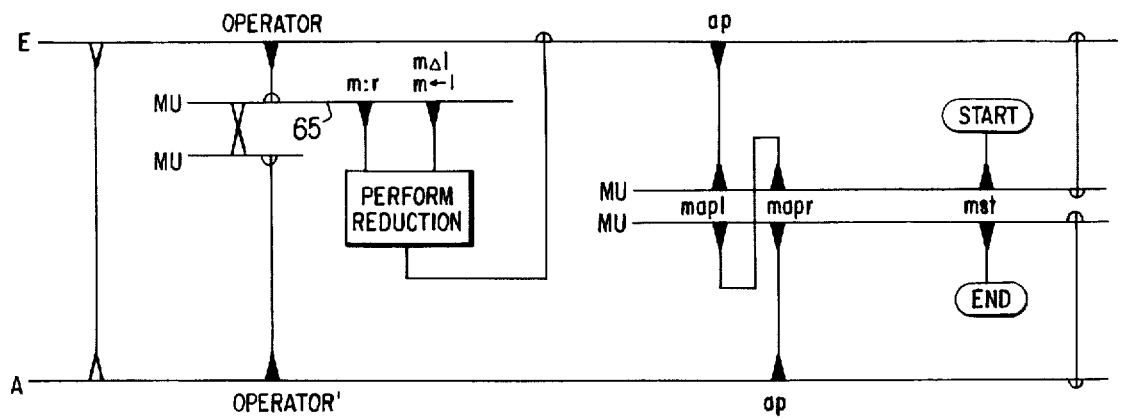
FIGS. 6a, 6b, 6c, 6d, 6e, 6f and 6g are diagrams similar to that of FIG. 4 relating to other transposition algorithms.

FIG. 6a illustrates a general scheme for finding the instance of a reduction rule. This test is only installed for the applicators :, ←, and Δ, since expressions headed by the applicators ., →, and ∇ are translated already by the input algorithm into expressions headed by the applicators :, ←, and Δ. This is easily accomplished by permuting their left and right successor expressions. For each applicator appearing in the top stage of register E, its associated stack marker is read into MU. A single character operator appearing on top of E is tested for being in an operator position by distributor line 65 associated to stack MU. If one of the stack markers m:r, m←1, or mΔ1 appears on top of MU, indicating that the operator is in operator position, it is removed from stack MU, the reduction rule is performed and the result is placed on top of stack E.

If any other stack marker appears on top of stack MU, it is left unchanged and the operator is placed on top of stack A, as if the simple transport algorithm EA were in operation.

Figure 6B:
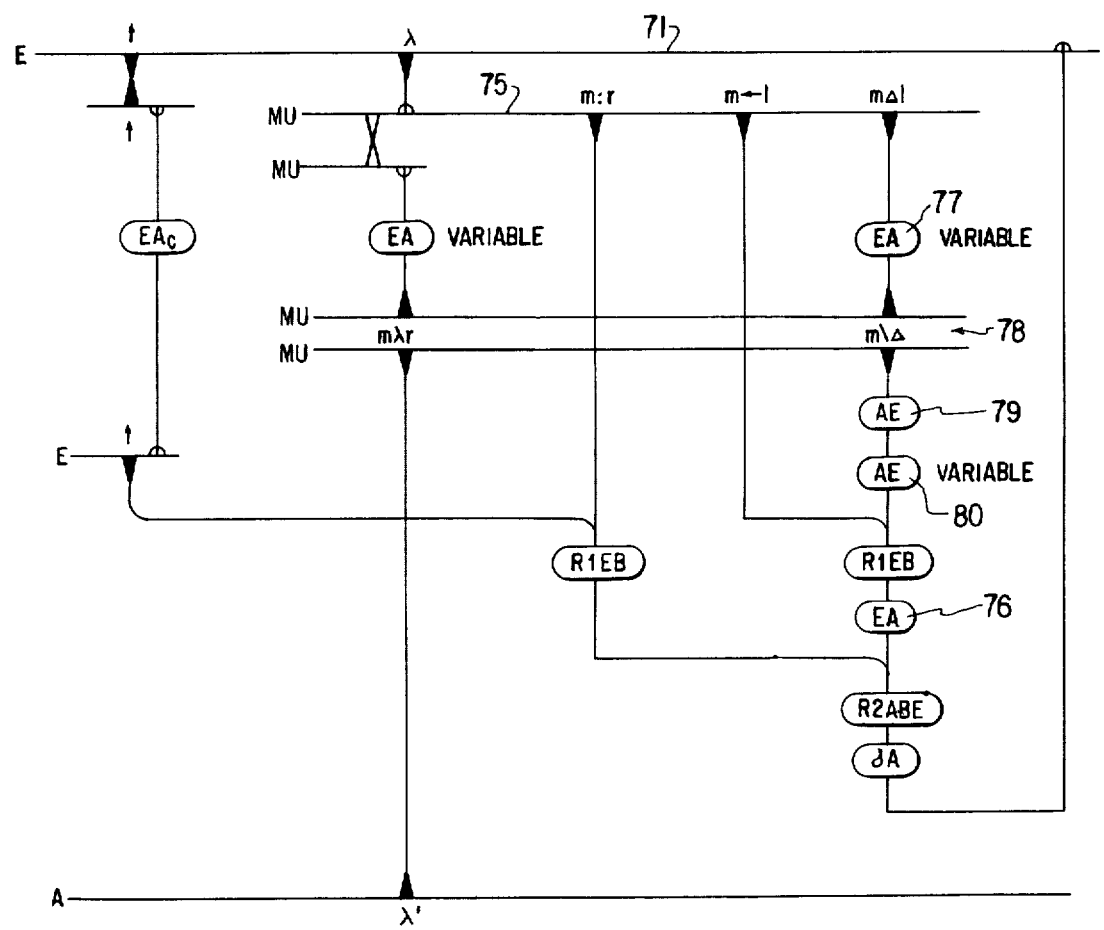

The most complicated reduction rule included in this embodiment comprises the beta conversion rule of the lambda calculus. FIG. 6b exhibits that part of the algorithm EAR which handles this case.

Beta conversion is concerned with lambda expressions in the operator position of an applicator. A lambda expression is headed by the constructor λ which may take only a variable as its left successor. This variable is singled out from all other variables occurring in the right successor expression of the constructor λ, in that occurrences of this variable may be replaced by the operand component of an applicator.

The distributor line 75 in FIG. 6b singles out those cases which do not lead to a reduction. The left successor of the constructor λ, which is a variable, is transported to stack E by algorithm EA, then algorithm EAR calls on itself to reduce the right successor expression of the constructor λ. The lambda expression ends up transposed on top of stack A.

If, however, one of the stack markers m:r, m←1, or mΔ1 appears on top of stack MU, the beta conversion rule is performed. The difference of the applicators now comes to bear on the handling of the operand component.

Referring back to FIG. 6a, it will be seen that the operand of the applicator : has already been reduced and transferred to stack A, while the operand component of either one of applicators ← or Δ is now the third item from the top in stack E.

Referring again to FIG. 6b, upon appearance of the applicator :, the algorithm EAR calls on algorithm R1EB which looks for free occurrences of the variable v (first item on top of stack E) in the expression (second item from the top in stack E). The expression is now transposed and located on top of stack B with special markers □ to indicate places for substitution. Then algorithm R2ABE basically involves a transportation back to E, except that the top item of stack A, which is the operand component, will be copied from stack A to substitute the marker □ as often as it appears. Finally, the original of the operand on top of stack A can be discarded by calling the algorithm δA. The reduction rule is completed and control returns to distributor line 71.

The constructor ← causes a similar sequence. However, the operand component (third item from the top of stack E) has to be transported, unreduced, to stack A by calling algorithm EA at 76. Then algorithm EAR proceeds as above.

As already defined earlier, the constructor Δ indicates a reduction of the operator component before being applied. Thus, first the variable (first component on top of stack E) is moved to stack A at 77 to uncover the expression. The algorithm EAR calls on itself, at 78, to reduce this expression. Then transport algorithm AE is called twice to move back to stack E the reduced expression 79 and the variable 80. This arrangement permits the process to now proceed with a calling of algorithm R1EB. Then algorithm EAR proceeds as above.

The binding constructor ↑ indicates an instance of the recursion reduction rule. A copy of the expression headed by the constructor ↑ is first copied as an operand to stack A. Then the constructor ↑ is removed and the arrangement thus constructed allows the processor to proceed as if constructor : would have been detected.

The algorithms R1EB and R2ABE correspond to the representation functions R1 and R2, respectively, and will be described later.

Figure 6C:
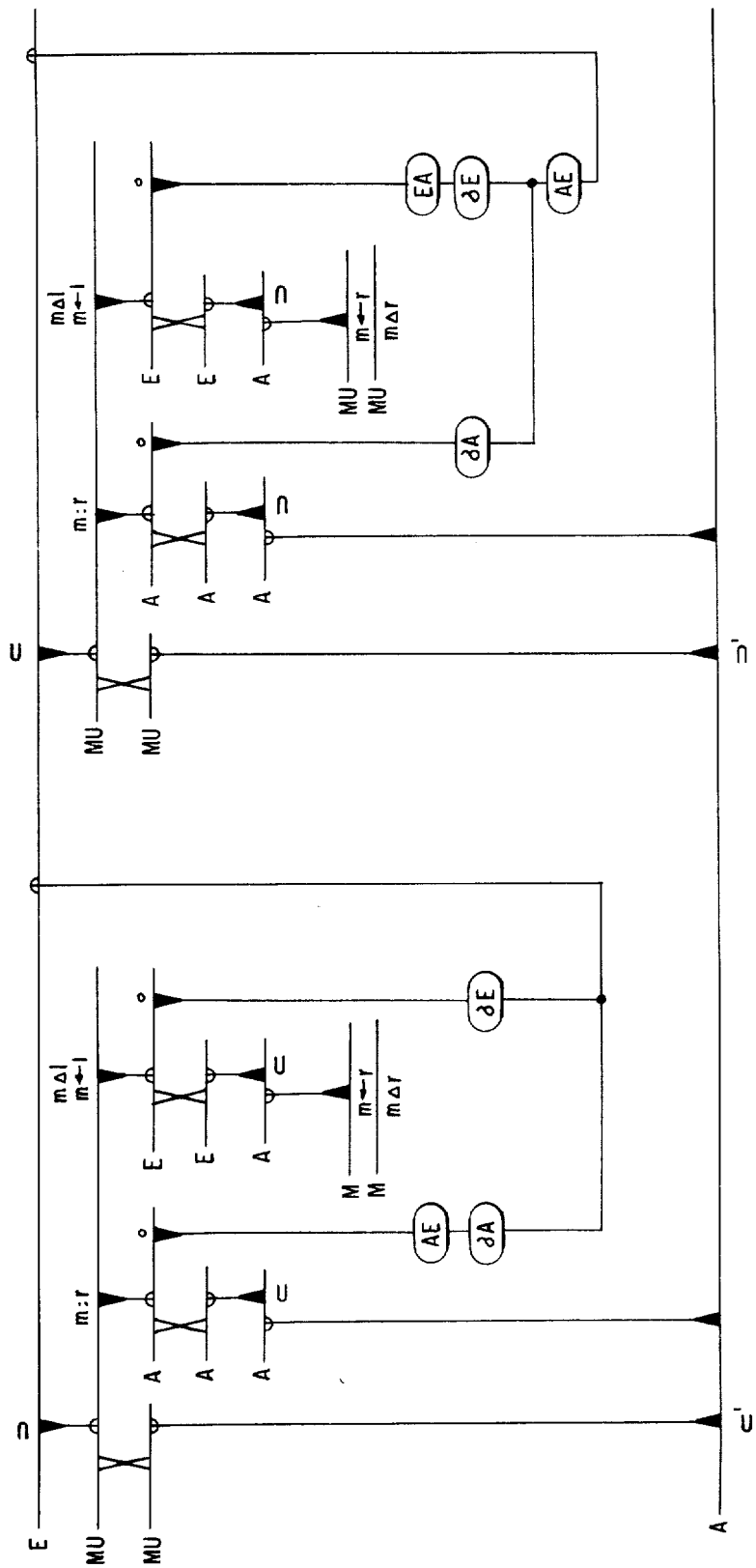

FIG. 6c exhibits that part of algorithm EAR dealing with list selectors ⊂ and ⊃ corresponding to CAR and CDR of the programming language LISP, respectively.

The operand has to be headed by the list constructor to make up the instance of a reduction rule. Thus, three distributing levels are necessary.

If the instance of a reduction rule has been established, the constructor ⊃, e.g., has been removed from stack E, as has the stack marker m:r from stack MU, and the constructor ○ from stack A. The operator ⊃ calls for the right successor of the constructor ○, which is now the top item on stack A, and which is transported to stack E. The left successor of the constructor ○ has thus become the top item on stack A and is deleted. It should be noted that the left and right successors of constructor ○ are in inverted order in stack A.

The operand expression headed by the list constructor ○ is still on top of stack E, if the constructors ← and Δ are involved. In these cases, it suffices to delete the first item on top of stack E to bring the right successor of the constructor ○ on top of stack E.

Conversely, the operator ⊂ calls for the left successor of the constructor ○. The deletion of the right successor is accomplished by calling algorithm δA followed by algorithm EA, if the operand is in stack A, and by temporarily removing the top item of stack E, deleting the following item and restoring the previously removed top item, if the operand is in stack E.

Figure 6D:
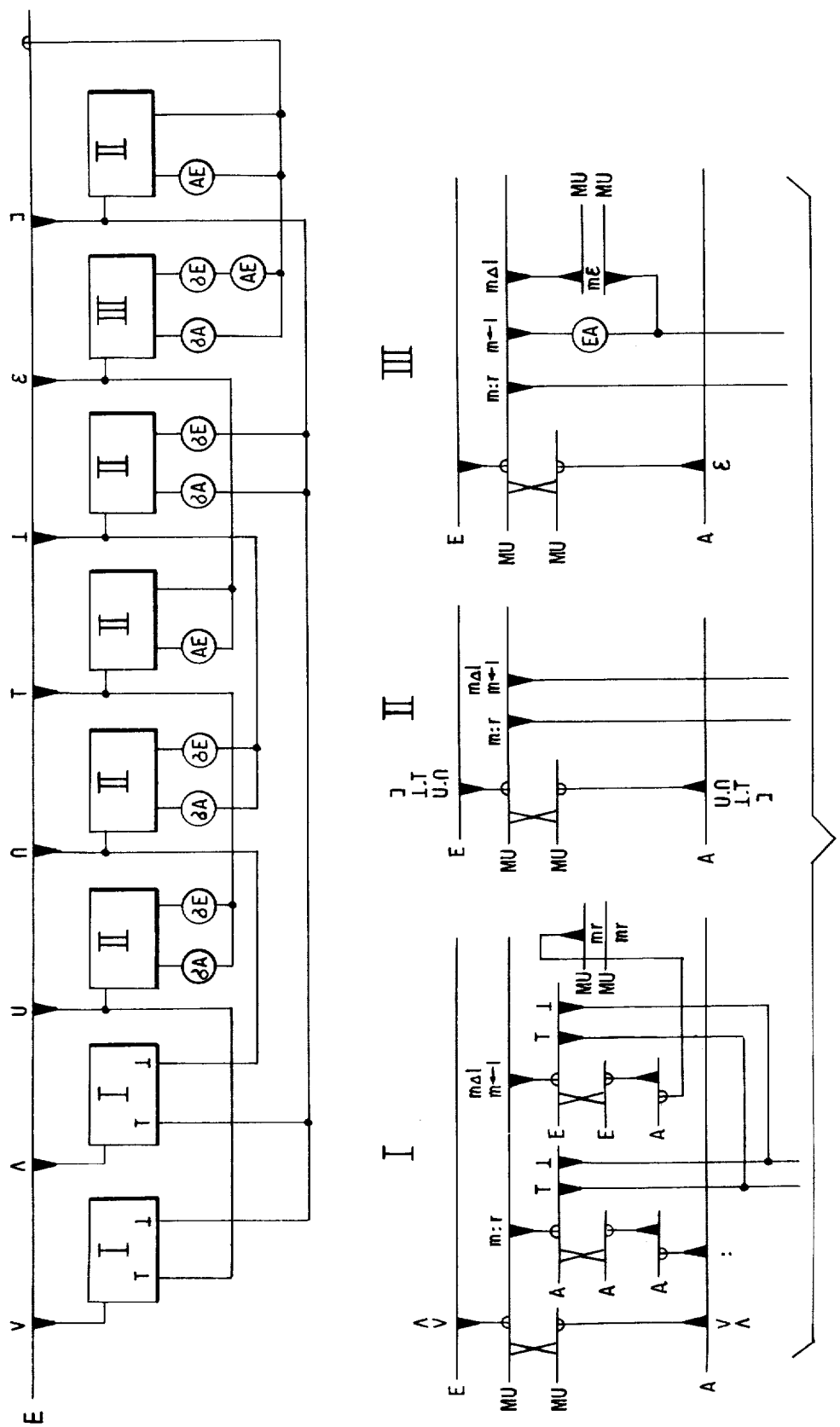

FIG. 6d exhibits the processing of reduction rules concerned with truth values and logical connectors. They are all intimately related. The three diagrams on the bottom of FIG. 6d represent respective ones of the eight blocks I, II, and III in the diagram at the top of FIG. 6d. The remainder of all reduction rules provided in this embodiment are represented in the top diagram. Only calls on transportation algorithms and deletion algorithms are involved once the instance of a reduction rule has been established.

Figure 6E:
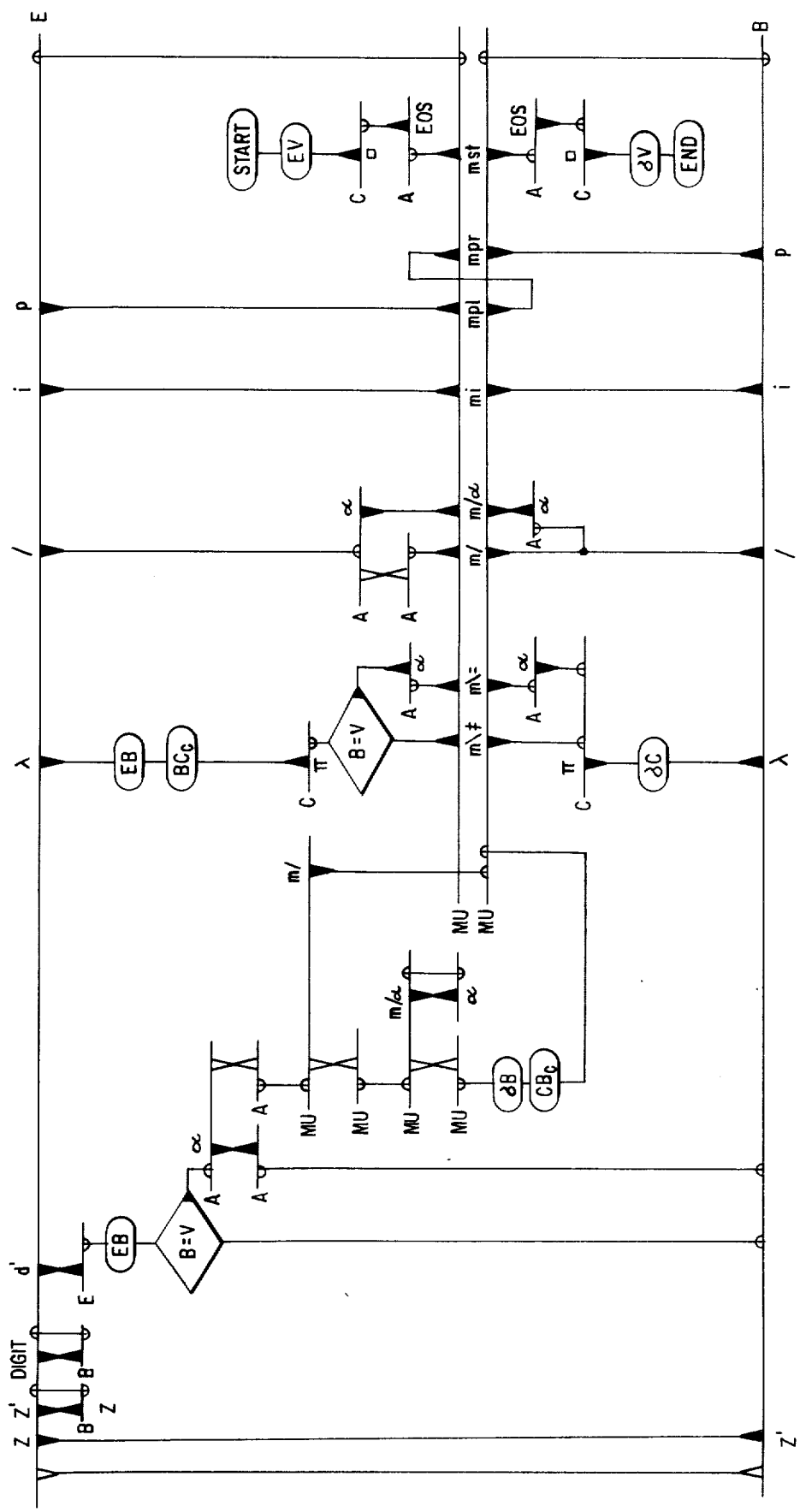
Figure 6F:
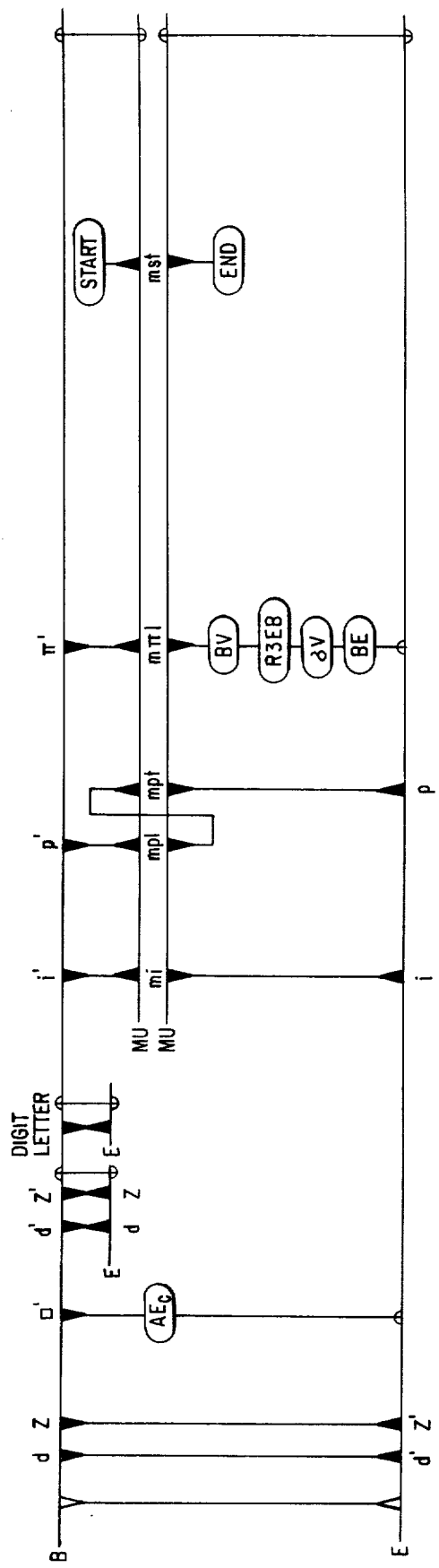
Figure 6G:
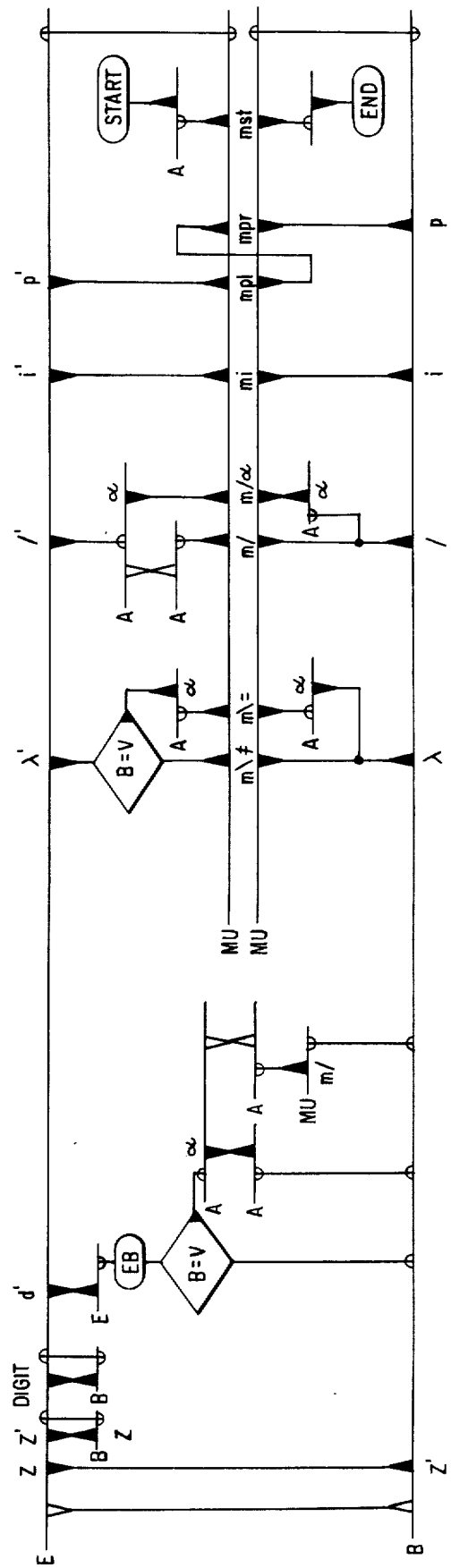

The most difficult part of beta conversion is exhibited in FIGS. 6e, 6f and 6g. The subject matter involved here concerns the possible confusion of variables after a substitution. A lambda expression λve singles out instances of a variable v for a distinct expression e, namely, the right successor of the lambda constructor. This singling out is also called binding. If, in this expression e, another expression is substituted which also contains variable v, these instances seem to be singled out, too. According to the theory of the lambda calculus, this is an error. Such additional instances of the variable v caused by substitution have to be distinguished by prefixing these instances by the lambda bar constructor / to exempt them from being singled out.

Algorithms R1EB, R2ABE and R3EB are constructed to handle substitution without confusion of variables by deploying lambda bar operators at the right times and places. Details not shown are constructed as in the corresponding transportation algorithms.

The algorithm R1EB operates on the top items of stack E which are the two successors of a lambda constructor, namely a variable and an expression. This variable is first transported to a stack V, and stacks C and A are prepared with special markers.

Special procedures in this algorithm are employed only for words (variables), the λ constructor, and the lambda-bar constructor.

A variable is brought to stack B first, then the top items of stack B and stack V are compared. If equal, the variable on top of stack B is a candidate for replacement, but only if the right number of lambda bars are prefixed to this instance of the variable. This is determined by comparing the number of stack markers m/ in stack MU with the number of a-markers in stack A. If they agree, the variable gets deleted from stack B, and the special marker □ gets copied from stack C to stack B.

Generally, the marker □ in stack C is augmented by variables which could cause confusion, as will now be seen.

Lambda expressions get transported to stack B as usual by calling algorithm EB to transpose the variable and calling R1EB by itself for transposing the expression.

In addition to that, the variable is also copied to stack C to inform algorithm R3EB to prefix instances of this variable by lambda-bars.

If this variable is also equal to the variable on top of stack V, an α-marker is inserted into stack A to inform algorithm R1EB.

To qualify a variable for substitution, algorithm R1EB must have encountered an equal number of lambda constructors and lambda-bar constructors when arriving at this variable.

The lambda-bar constructor causes stack markers to be pushed into the stack MU in dependence on the α-markers in stack A. In a preferred embodiment, this will be accomplished by effecting counting employing counters and this will greatly simplify algorithm R1EB.

FIG. 6f exhibits the algorithm R2ABE which is basically a transportation algorithm from stack B to stack E. Beyond normal transportation, this algorithm copies the operand from stack A to stack E if the special marker □ is encountered in stack B.

The special marker □ is usually part of an expression built up in stack C by variables and the auxiliary constructor π.

Each constructor π' gives rise to a stack marker mπ1 in stack MU. If such a stack marker is detected on top of stack MU, a variable is present on top of stack B. This variable informs algorithm R3EB to prefix instances of this variable in the operand expression by lambda bars.

This variable is therefore moved to the top of stack V, algorithm R3EB is called, after returning from algorithm R3EB the variable may be deleted from stack V and the expression returned to stack E.

This procedure is repeated as often as the auxiliary π constructor has been inserted by algorithm R1EB.

Finally, FIG. 6g illustrates the algorithm R3EB, which is basically a transportation algorithm from stack E to stack B with exceptions for variables, the lambda constructor, and the lambda-bar constructor.

To be a candidate for prefixing, a variable must be equal to the one on top of stack V and must have the right number of lambda-bars prefixed to it. If this is the case, an additional stack marker m/ is pushed onto stack MU, causing an additional lambda-bar to subsequently be prefixed in the lambda-bar branch of FIG. 6g.

The number of nested lambda expressions encountered with a variable equal to the one on top of stack V is counted by inserting α-markers into stack A in the lambda branch of FIG. 6g.

The above-described examples demonstrate merely the basic structure of the reduction computer according to the invention. Further reduction rules can easily be added as long as codes are available for the different stack markers.

In the described computer an expression which is to be reduced is always present completely and in linearized form. It is therefore possible to limit computing operations to parts of the expressions. For this purpose, and referring again to FIG. 2a, it is of advantage to define an attention region FA which is in communication with the output unit Z and which may be associated with a selectable limited region (subtree) of the expression on top of the stack registers E, thereby reducing only that part of the expression. The adjustment of the attention region is effected by suitable input signals, for example, move to a left or right component of an expression or to a surrounding subexpression. The attention region thus constitutes the field of vision of the user with respect to the problem to be treated by the computer.

If an expression is to be reduced, it is initially transferred to the top region of stack E. With the input of arbitrary numbers into a dialing device provided for this purpose, the number of reduction steps to be performed by the computer, if reducibility exists, can be predialed. The result is the reduced contents of the attention region, i.e. a constant expression, if a sufficiently high number of reduction steps has been dialed.

This predialing of the number of reduction steps is of advantage because, due to known theoretical results, not all reduction sequences may terminate in a constant expression. Since the dialed number of reductions is always finite, the machine will always terminate, but not necessarily with a constant expression. Non-termination may occur, for example, if performance of a reduction rule yields a new instance of this reduction rule.

FIG. 7 is a table setting forth one suitable example of the coding of a complete set of data characters, constructors, stack markers, and arithmetic and logic operators into 8-bit binary bytes, which is the form required by the machine. For each entry of the table, the first four bits of the binary code representation are constituted by the binary representation of the decimal value designating the row in which the entry appears and the second four bits are the binary representation of the decimal value designating the column in which the entry appears.

Thus, for example, the application constructor → is located in row 4 and column 10. The binary representation of the numeral 4 is 0100, and the binary representation of the numeral 10 is 1010. Therefore, the binary representation of → is 01001010. Similarly, the binary representation of alphabet letter G (row 8, column 7) is 10000111. This table thus unequivocally associates one 8-bit binary word, or byte, to each character and stack marker which the system might employ.

It will be noted that the table is not completely filled so that there is room for future expansion of the system within the framework of 8-bit machine words.

The most significant advantages obtained by the present invention can be summarized as follows: in the described computer the reduction sequence is entirely clear with respect to its time sequence as well as with respect to the problem to be treated over its entire width. There exists the possibility of direct and local access by the user to the reduction sequence since each reduction step results in an expression of the reduction language. Both of the above together result in extremely high dependability for user operation. If an error occurs, this is indicated by the occurrence of nonreducible expressions which provide information as to the origin of the error. The reduction sequence is established from left to right according to the introduction of a selectable number of reduction steps, and free-running operation is neither intended nor desired.

The tree structure of the expressions to be reduced permits limitation of the reduction process to selectable regions of these expressions. These regions are transferred into the attention region which is connected with the output, where they are subjected to monitoring by the user whereas the expressions outside of the attention region may remain unchanged. All measures taken by the user remain within limits and are predictable.

It will be understood that the above description of the present invention is susceptible to various modifications, changes and adaptations and the same are intended to be comprehended within the meaning and range of equivalents of the appended claims.

What is claimed is:

1. In a computer including a control unit, an arithmetic-logic unit, an input unit, an output unit, a signal storage unit, and a plurality of signal conducting buses, the improvement wherein:
   said signal storage unit comprises at least three stack registers of arbitrary length, each said register presenting a plurality of binary word storage locations each capable of storing a binary word and the word storage locations of each said register being connected in succession to permit shifting of such words between locations;
   said input unit is connected to said buses to supply a succession of binary words constituting binary encoded elements representing the atoms and constructors of a complete preorder linearized binary tree expression of a complete logic relation representing a problem to be solved, each atom representing a parameter to be operated on, each constructor defining a particular relation between two such elements, and each element being composed of at least one binary word;
   each of said units is connected to communicate selectively with all of said buses, and each of said stack registers is connected to communicate selectively with all of said buses in a manner to transport binary encoded elements into and out of each said stack register only via the storage location at one end thereof; and
   said control unit comprises means for sensing the identities of the binary encoded elements contained in the storage locations at said one end of a plurality of said registers, and means for altering the binary word of said storage location at said one end of at least one said register as a function of the identities of the binary encoded elements sensed by said means for sensing.

2. A computer as defined in claim 1 wherein said means for altering in said control unit alters the content of said storage location at one end of said at least one register by effecting a transformation constituting a reduction rule.

3. A computer as defined in claim 2 wherein said control unit further comprises means connected to said stack registers for effecting shifting of binary words between successive storage locations of each said register.

4. A computer as defined in claim 3 wherein said means for altering in said control unit is connected for selectively transferring the binary encoded elements of an expression from said storage locations at said one end of a first one of said stack registers to said storage locations at said one end of a second one of said stack registers while converting the expression into its transposed form.

5. A computer as defined in claim 4 wherein said control unit is connected to a third one of said stack registers for transferring to and from said third one of said registers only elements representing constructors in such expression during such selective transfer of elements from said first one of said stack registers to said second one of said stack registers.

6. A computer as defined in claim 5 wherein at least certain ones of such selective transfers of binary encoded elements produce an instance of a particular reduction rule, each such reduction rule being defined by a particular combination of binary encoded elements being present in the storage locations at said one end of said plurality of said registers, and wherein said means for altering is arranged to produce, in response to, sensing by said means for sensing of such particular combination of binary encoded elements, a binary control word related to the particular reduction rule and to conduct such control word in a manner to alter the binary word of said storage location at said one end of said at least one register in a particular manner determined by such reduction rule.

7. A computer as defined in claim 6 wherein said control unit further comprises state identifying means including a further state stack register composed of a plurality of word storage locations, with the storage location at one end of said further register being connected to receive and store successive binary words constituting state codes identifying the sequence of operations performed on the binary words contained in the storage locations at said one end of said plurality of said registers under control of said means for sensing and constituting execution of such reduction rule.

8. A computer as defined in claim 7 wherein said state identifying means further comprise an array of flip-flops connected to be selectively set into a state pattern identifying a characteristic of the sequence of operations performed on the binary words contained in the storage locations at said one end of said plurality of said registers during the execution of a reduction rule.

9. A computer as defined in claim 8 wherein said preset means for altering comprise a memory unit having a plurality of memory locations each permanently storing a respective binary control word, and said means for sensing comprise addressing means connected to address a selected memory location of said memory unit, and to produce readout of the binary control word stored in that location, upon sensing of the particular combination of binary encoded elements defining the reduction rule to which that binary control word is related.

10. A computer as defined in claim 9 wherein said control unit further comprises actuating means connected between said memory unit, said stack registers and said array of flip-flops for causing the readout of a respective one of the binary control words to produce at least one of the operations of: pushing a binary word into said storage location at said one end of one of said registers; popping a binary word from said storage location at said one end of one of said registers; and altering the state pattern in said array of flip-flops.

11. A computer as defined in claim 10 wherein said addressing means are connected for responding to the sensing by said means for sensing of such combination of binary encoded elements defining a reduction rule, in order to address the selected location of said memory unit which corresponds to that reduction rule, and said actuating means are connected for producing at least a selected one of said operations in order to execute that reduction rule.

12. A computer as defined in claim 11 wherein said means for sensing further comprise a decoder having inputs connected to said storage location at said one end of each of said registers and having outputs connected for establishing a selected connection pattern from said storage location at said one end of each of said registers to said addressing means in dependence on the pattern of signals at said decoder means inputs.

* * * * *

UNITED STATES PATENT AND TRADEMARK OFFICE
CERTIFICATE OF CORRECTION

PATENT NO. : 4,075,689
DATED : February 21st, 1978
INVENTOR(S) : Klaus Berkling

It is certified that error appears in the above-identified patent and that said Letters Patent are hereby corrected as shown below:

In the heading of the patent, under [30] Foreign Application Priority Data, change "June 10, 1975, Germany...2557958" to --June 10, 1975, Germany...2525795--.

Signed and Sealed this

Twenty-third Day of May 1978

[SEAL]

Attest:

RUTH C. MASON
Attesting Officer

LUTRELLE F. PARKER
Acting Commissioner of Patents and Trademarks